United States Patent
Guterman et al.

(10) Patent No.: US 7,975,057 B2
(45) Date of Patent: Jul. 5, 2011

(54) TIME MANAGEMENT AT COMMUNICATION PROTOCOL LAYER FOR A SMART CARD-TYPE DEVICE

(75) Inventors: Pascal Guterman, Roquevaire (FR); Laurent Bonnet, Aiguilles (FR)

(73) Assignee: Gemalto SA, Meudon (FR)

( * ) Notice: Subject to any disclaimer, the term of this patent is extended or adjusted under 35 U.S.C. 154(b) by 3242 days.

(21) Appl. No.: 10/203,028

(22) PCT Filed: Feb. 2, 2001

(86) PCT No.: PCT/FR01/00327
§ 371 (c)(1),
(2), (4) Date: Sep. 18, 2002

(87) PCT Pub. No.: WO01/57810
PCT Pub. Date: Aug. 9, 2001

(65) Prior Publication Data
US 2004/0015594 A1    Jan. 22, 2004

(30) Foreign Application Priority Data
Feb. 3, 2000  (FR) ..................... 00 01508

(51) Int. Cl.
*G06F 13/00*  (2006.01)
(52) U.S. Cl. ..................... 709/229
(58) Field of Classification Search .............. None
See application file for complete search history.

(56) References Cited

U.S. PATENT DOCUMENTS 6,157,966 A  * 12/2000  Montgomery et al. ........... 710/8
6,363,456 B1 *  3/2002  Nakano ..................... 711/103
6,488,211 B1 * 12/2002  Everett et al. ................ 235/492

FOREIGN PATENT DOCUMENTS

WO   WO 98/19237   5/1998
WO   WO 98/52160   11/1998

OTHER PUBLICATIONS

Vandewall, J., et al., *Developing Smart Card-Based Applications Using Java Card*, XP-002135233, Aug. 1998, pp. 1-18.

* cited by examiner

*Primary Examiner* — Robert B Harrell
(74) *Attorney, Agent, or Firm* — Buchanan Ingersoll & Rooney PC

(57) ABSTRACT

An entity of the smart card type has an application layer linked to a communication protocol layer. A time manager containing a timer interfaces with the protocol layer. The time manager substantially periodically constructs waiting time extension requests transmitted to a terminal through the protocol layer as long as data are being processed in the application layer. The application layer is thus freed from any time constraint.

6 Claims, 2 Drawing Sheets

TIME MANAGEMENT AT COMMUNICATION PROTOCOL LAYER FOR A SMART CARD-TYPE DEVICE

This disclosure is based upon French Application No. 00/01508, filed on Feb. 3, 2000 and International Application No. PCT/FR01/00327, filed Feb. 2, 2001, the contents of which are incorporated herein by reference.

BACKGROUND OF THE INVENTION

The present invention relates to time constraints in communication protocols of the application layer used in entities of the smart card type, also referred to as an integrated circuit card or microprocessor card. It relates particularly to communication protocols where time measurement constraints are severe, for example for communication protocols dedicated to cards with or without contacts, and difficult to take into account, for example for open operating systems.

The majority of smart cards, such as a credit card or a SIM (Subscriber Identity Module) telephone subscriber card, exchange, with terminals, such as readers or mobile radiotelephone stations, to which the cards are electrically connected during operation, data according to dedicated communication protocols according to ISO standard 7816-3.

According to this standard, during a process of exchanging data blocks (I-blocks) according to the T=1 asynchronous block transmission protocol at application layer level, the time between the leading edge of the last character of a first block received by the card and the leading edge of the first character of a second data block transmitted by the card may not exceed a predetermined maximum time BWT (Block Waiting Time). If, during the sequence of operations of the application process, the application layer of the card knows that the processing of the first block will exceed the predetermined maximum time and it must therefore put the terminal into a "wait state", the application layer transmits a specific protocol request referred to as "Waiting Time eXtension" WTX before expiry of the maximum time BWT. The information field of the WTX request contains an integer multiple of the maximum time BWT, defining a time allocated to the application layer of the card which starts after the reception of an acknowledgement transmitted by the terminal in response to the request.

If, following a first block, the card does not send another block normally before expiry of the time BWT, or on request, before expiry of the allocated time, the terminal interprets this absence of a block as a time-out and for example sends the first block again.

However, at application level, the smart card software programs are first designed independently of any notion of time relating to information exchanges.

On the one hand, the application is not intended to count the time since the performance time-wise is dependent on the operating system, particularly on the characteristics of the microprocessor, the system routines, etc. This problem is very difficult to solve in open operating systems such as JavaCard, where the application, such as an applet, is assumed to be an independent platform.

On the other hand, it is not desirable that the lower level sub-programs (kernel) are responsible for issuing these requests since they are completely disconnected from the time aspects.

Thus, certain communication protocols are very restrictive in terms of time management, since the time values are directly linked to the efficiency of the protocol, for example dedicated contactless card protocols.

Two types of management of waiting time extension WTX requests are known according to the prior art for solving this problem.

In a first type, as shown in FIG. 1, the waiting time extension WTX requests supplied by the protocol layer PR1 underlying the application layer AP1 in the card are managed by the application layer AP1 itself. This software architecture is not portable, that is to say the times are dependent on the sub-programs K1 (kernel), it has an empirical time counting, is not applicable when the application calls a service having a long processing process, for example a complex cryptography algorithm, does not take into account specific parameters such as the durations of waiting times, and is very restrictive for the application during short waiting times, for example those relating to dedicated contactless protocols.

According to a second type, the waiting time extension WTX requests are supplied by the protocol layer PR2 to the sub-programs (kernel) K2 which manage them, as shown in FIG. 2. This second known software architecture is advantageous in that the application is relieved of the management of the WTX requests which is a requirement in open operating systems since the functions of the application are independent of the functions of applications with at least one external entity. Furthermore, the software architecture facilitates the implementation of a long process by inserting a number of calls with WTX requests during the process.

However, this second software architecture is neither rigorous nor exhaustive owing to the difficulties to be considered each call sequence by sub-programs, does not taken into account specific protocol parameters, such as waiting times, and may have repercussions on each sub-program.

SUMMARY OF THE INVENTION

The invention aims to improve time management in the software architecture at application level according to the first type in a smart card, by freeing the application layer from this time constraint.

To that end, an entity of the smart card type, having an application layer linked to a communication protocol layer, is characterised in that it comprises a time manager interfacing with the protocol layer for substantially periodically constructing, at the expiry of a waiting time, a waiting time extension request transmitted to a terminal through the protocol layer as long as data are in the process of being processed in the application layer.

The time manager comprises in practice a time counting means which is activated after reception of a command with or without data transmitted by the terminal or after a response with data transmitted by the entity, which is de-activated pending a command with data by the application layer or substantially at the time of transmission of a response with or without data to the terminal, and which is de-activated and then re-activated substantially at the expiry of each waiting time causing transmission of the extension request to the terminal. The time counting means is for example integrated in the microprocessor of a smart card which is thus distinct from the protocol layer and from the set of sub-programs.

The software architecture at application level according to the invention ensures that the time counting is not performed as a base task in the application layer and does not interact with times laid down by the central unit (CPU) of the entity, such as a microprocessor The application layer does not consider the processing time of a data block and depends on the protocol layer for managing this time with the terminal, by putting the terminal into a wait state. A program is thus developed in the application layer without worrying about the processing time relating to this program.

The invention also relates to a method of managing time at the level of the application layer linked to a communication protocol layer in an entity of the smart card type, characterised in that it comprises the following steps:

providing a time manager interfacing with the protocol layer linked to the application layer, activating the time manager, by means of the protocol layer, in response to a command with or without data transmitted by a terminal or after a response with data transmitted by the entity to the terminal, so as to substantially periodically construct waiting time extension requests transmitted by the protocol layer to the terminal, and deactivating the time manager when the protocol layer is waiting for a command with data or substantially when the protocol layer transmits a response with or without data.

Preferably, the activation step comprises the following periodic steps:

counting down a waiting time with the time counting means included in the activated manager, deactivating the counting means and constructing, by means of the manager, a waiting time extension request substantially at the expiry of a waiting time, and transmitting the extension request by means of the protocol layer to the terminal, and activating the counting means.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION

Figure 1:
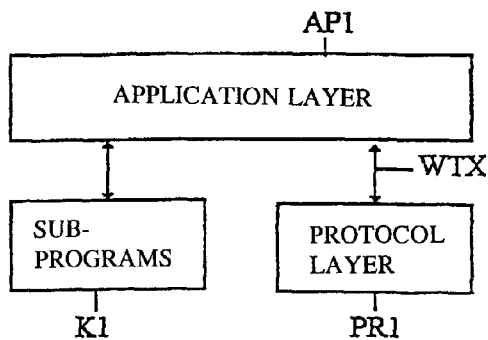
FIG. 1 depicts schematically the software modular architecture at application layer level in a smart card according to a first type of the prior art already commented upon.
Figure 2:
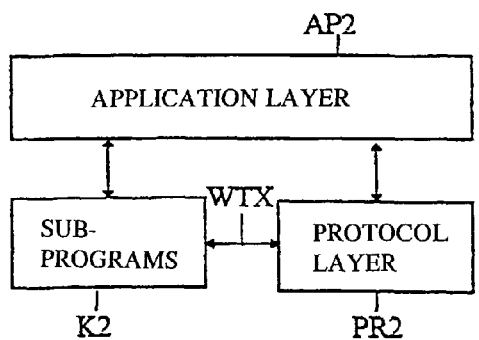
FIG. 2 depicts schematically the software modular architecture at application layer level in a smart card according to a second type of the prior art already commented upon.
Figure 3:
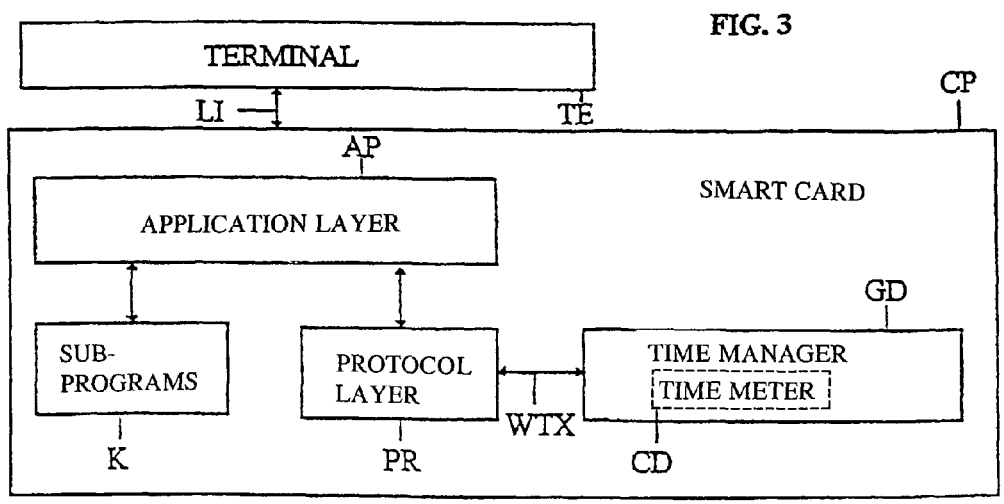
FIG. 3 depicts schematically the software modular architecture at application layer level in a smart card according to the invention.

FIG. 3 shows, in a smart card CP, the software architecture of an operating system according to the first type shown in FIG. 1, at the level of the application layer AP linked to an underlying communication protocol layer PR and to lower level subprograms and programming tools (kernel) K. The smart card is connected to a terminal TE such as a card reader or a mobile radiotelephone terminal by a simplex link LI with or without electrical contacts.

According to the invention, a time manager GD is interfaced directly to the protocol layer PR so as to control therein waiting time extension WTX requests. The time manager uses a dedicated time counting resource, for example a timer CD clocked by clock pulses and implemented hardware-wise in or in connection with the smart card microprocessor. The communication protocol layer manages exchanges of commands and responses with the protocol layer of another entity, such as the terminal TE. The communication protocol is for example the "T=1" simplex asynchronous block communication protocol according to ISO standard 7816-3.

The software architecture according to the invention necessitates a specific software design in order to synchronize the requests with the protocol command primitives transmitted automatically and thus avoid protocol conflicts. This is because, at the time of initiation of a data processing process, on the one hand the application layer AP does not manage the processing time between the reception of data and the transmission of new data and relies permanently on primitives of the underlying protocol layer PR. On the other hand, the protocol layer PR, itself supervising, according to the invention, the data processing times in the application layer which is unaware of these times, must control the construction and transmission of WTX requests without disrupting the communication protocol.

The interfacing between the time manager GD and the protocol layer PR entails certain modifications in the protocol layer, compared with the prior art.

The protocol layer PR supplies, to the time manager GD, protocol parameters relating notably to the waiting times, like the maximum time BWT between a command with or without a data field (byte sequence) received in the card, as a protocol data unit, and a response with or without a data field to be transmitted by the card. The timer CD included in the manager GD is initialized with these parameters supplied by the protocol layer PR.

Dependent upon the sequence of operations of the communication protocol, the protocol layer PR controls the activation of the timer CD and therefore the construction of WTX requests by the time manager GD which avoids protocol conflicts. Thus, a counting down, or a counting up, of a predetermined number of clock pulses in the timer CD causes the production of a WTX request by calling a communication service concerned in the protocol layer PR without the latter knowing precisely the processing time required by the application layer.

Figure 4:
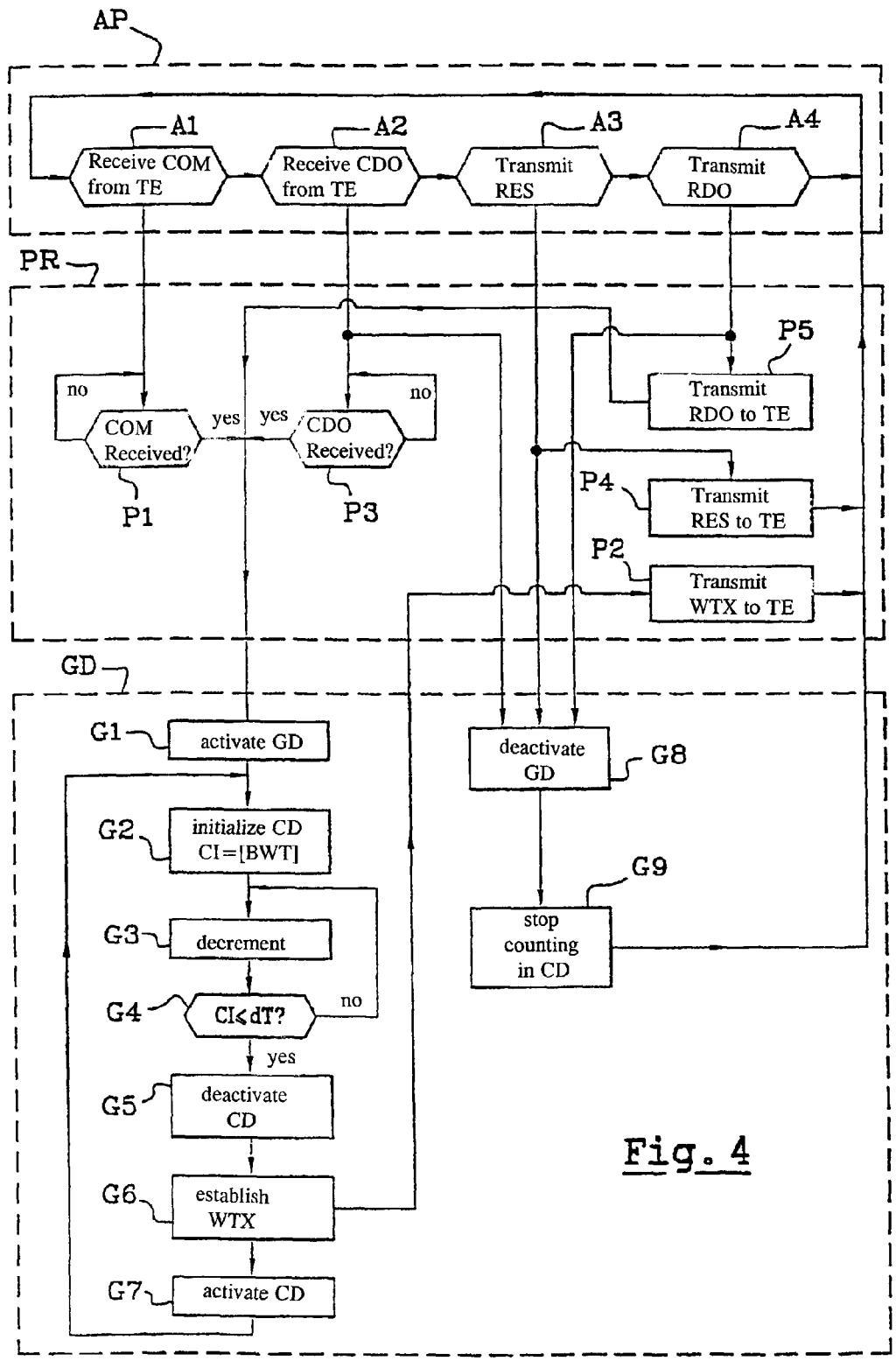
FIG. 4 is an algorithm for managing time between the protocol layer and a time manager in the software architecture according to the invention.

With reference to an example time management method illustrated in FIG. 4, this is presented for four main types of protocol data unit APDU processed and constructed by the application layer AP, namely commands without data COM and commands with data CDO transmitted by the terminal TE to the card CP through the link LI, and responses without data RES and responses with data RDO transmitted by the card CP to the terminal TE through the link LI. Thus, the method of managing time at the level of the application layer AP comprises four steps A1 to A4 relating to these four types of protocol unit COM, CDO, RES and RDO; each of the four protocol units initiates interactions between the protocol layer PR and the time manager GD, after an initialization. During the initialization, the aforementioned protocol parameters relating notably to the wait data and defined in the protocol layer PR are transmitted to the manager GD for setting the timer CD accordingly.

The cyclic sequence of steps A1 to A4 in the application layer AP ensures that there is no conflict between protocol units notably to be transmitted and received.

Furthermore, the application layer AP has functionalities totally independent of the cycle of steps in the time manager described later.

When a command without data COM is to be received in the application layer (step A1), the protocol layer PR supervises and manages reception of the command at a step P1.

If a COM command is detected, the protocol layer PR invokes a procedure for activating the time manager GD at a step G1. In the time manager, the activation step G1 initializes the timer CD at a step G2, for example by setting the count CI thereof equal to a number [BWT] representing the maximum time BWT between a received protocol unit, such as the COM command, and a protocol unit transmitted by the smart card CP.

Then, a counting down of clock pulses is initiated at a step G3. Cyclically at an intermediate step G4 in response to each clock pulse, the manager GD compares the count CI of the counter CD with a parameter dT, such that dT<<[BWT], defining a time, small compared with the maximum time BWT, for transmitting a WTX request. Thus, as long as the count CI is greater than dT at the step G4, counting down of the clock pulses is continued. As will be seen subsequently with regard to the steps A3 and A4, the counting down is continued as long as the application layer AP has not produced a RES or RDO response to the COM command.

If the count CI reaches dT at the step G4, the counter CD is deactivated at the step G5. The manager GD then constructs, at the following step G6, a waiting time extension WTX request applied to the protocol layer PR, and, at a step G7, again activates the counter CD whose count is reset to CI=[BWT] at the step G2 which continues with cycles of steps G3 and G4. After having constructed and transmitted the WTX request to the terminal TE at a step P2, the protocol layer PR signals this to the application layer AP which will maintain the WTX request generation cycle G2 to G7 as long as a response is not to be transmitted.

When a command with data CDO is to be received in the application layer (step A2), the protocol layer PR invokes a procedure for deactivating the manager GD at a step G8 in order that the manager GD stops and thus prevents any counting down in the counter CD at a step G9, the counter CD possibly being in the process of counting down following a response with transmitted data RDO. The protocol layer PR also supervises and manages the reception of a CDO command at the step P3.

If a CDO command is detected at the step P3, the protocol layer PR invokes a procedure for activating the time manager GD at a step identical to the step G1 which initializes the timer CD at the step G2 and initiates the steps already described G2 to G7 in the manager GD, with possibly the transmission of a constructed WTX request at the step P2, as long as a RES or RDO response is not produced which would suspend the counting down in the counter CD.

When a response without data RES is to be transmitted by the application layer (step A3), the protocol layer PR invokes a procedure for deactivating the manager GD at the step G8 which stops the counter at the step G9, since the counter CD was started upon reception of a COM or CDO command and maintained in the cyclic counting down state as long as the application layer has not completed the processing generated by this last command. Substantially simultaneously, the protocol layer PR transmits the RES response by encapsulating it at a step P4.

Similarly, when a response with data RDO is to be transmitted by the application layer (step A4), the protocol layer PR invokes substantially simultaneously the procedure for deactivating the manager GD at the steps G8 and G9 and transmits the RDO response encapsulated by the protocol layer PR at a step P5.

However, the step P5 is followed by the step G1 during which the protocol layer PR invokes a procedure for activating the time manager GD according to the steps G2 to G7. This is because the response with data RDO is not necessarily the end of processing in the application layer which may still require time extension by transmitting one or more WTX requests in order to continue said processing, waiting for data transmitted by the terminal by at least one command with data CDO, as long as a "definitive" RES response is not transmitted.

The invention claimed is:

1. An entity of the smart card type, having an application layer linked to a communication protocol layer, and comprising a time manager interfacing with the protocol layer for constructing, at the expiry of a waiting time, a waiting time extension request and transmitting said request to a terminal through the protocol layer as long as data are being processed in the application layer.

2. An entity according to claim 1, in which the time manager comprises a time counting means which is activated after reception of a command with or without data transmitted by the terminal or after a response with data is transmitted by the entity, which is de-activated pending a command with data by the application layer or substantially at the time of transmission of a response with or without data to the terminal, and which is de-activated and then re-activated substantially at the expiry of each waiting time causing transmission of the extension request to the terminal.

3. A communicating device according to claim 1, wherein said communicating device is a smart card.

4. A method of managing time at the level of an application layer linked to a communication protocol layer in an entity of the smart card type having an application layer linked to a communication protocol layer, said method comprising the following steps:
    providing a time manager interfacing with the protocol layer linked to the application layer,
    activating the time manager, by means of the protocol layer, in response to a command with or without data transmitted by a terminal or after a response with data transmitted by the entity to the terminal, so as to construct waiting time extension requests transmitted by the protocol layer to the terminal, and
    deactivating the time manager when the protocol layer is waiting for a command with data or when the protocol layer transmits a response with or without data.

5. A method according to claim 4, wherein the activation step comprises the following periodic steps:
    counting down a waiting time with a time counting means included in the activated time manager,
    deactivating the counting means and constructing, by means of the time manager, a waiting time extension request substantially at the expiry of a waiting time,
    transmitting the extension request by means of the protocol layer to the terminal, and
    activating the counting means.

6. A method according to claim 4, wherein said communicating device is a smart card.

* * * * *